April 12, 1932.  C. CATTRAN  1,853,258
PRINTER'S BLANKET
Filed Sept. 12, 1928

Inventor
Charles Cattran

By

Attorney

Patented Apr. 12, 1932

1,853,258

UNITED STATES PATENT OFFICE

CHARLES CATTRAN, OF AKRON, OHIO, ASSIGNOR TO THE GOODYEAR TIRE & RUBBER COMPANY, OF AKRON, OHIO, A CORPORATION OF OHIO

PRINTER'S BLANKET

Application filed September 12, 1928. Serial No. 305,457.

This invention relates to printing machines, and it has particular relation to machines of the above designated character which employ printer's blankets for cushioning the paper during the printing operation.

An object of the invention is to provide a printer's blanket having a relatively smooth surface for engagement with the paper, which shall not be subject to the formation of cracks, and the separation of the layers of material of which they are composed.

Heretofore, printer's blankets have been composed of a felt base and an outer layer of relatively hard rubber, the latter of which was chemically treated in order to make it resistant to the oil in printer's ink which has a very deteriorating effect on rubber. During the use of such blankets, and especially after ageing thereof, the rubber frequently developed cranks in the surface thereof which were caused largely by the stresses set up therein during the bending of the blanket and by the pounding of the type thereon. Oil seeping into the interior of the blanket through the cracks thus formed tended to separate the rubber from the felt base, and it was not uncommon for a single crack to initiate the separation of the rubber and felt base, throughout a large portion of the blanket.

This invention, to a large extent, obviates the difficulties heretofore encountered by providing a thin layer of relatively soft rubber between the hard rubber and the felt base. This effects a much stronger union between the felt and the hard rubber, because the felt adheres readily to soft rubber and the soft rubber, in turn, adheres readily to the hard rubber. The soft rubber also prevents the development of cracks in the hard rubber, because it provides a resilient intermediate cushion between the latter and the felt. When for any reason the hard rubber surface of a blanket of this type is broken, actual tests have revealed that the presence of the soft rubber between the hard rubber and the felt effectively prevents separation of the hard rubber therefrom.

Figure 1:
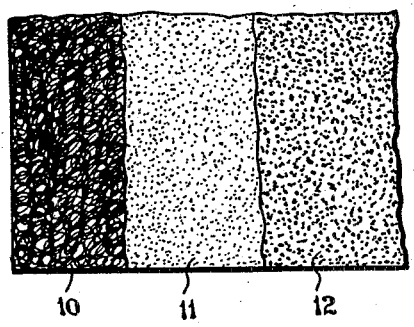
Figure 2:
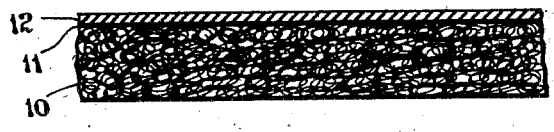

For a better understanding of the invention, reference may now be had to the accompanying drawings, forming a part of the specification, of which;

Figure 1 is a fragmentary plan view of a printer's blanket constructed according to the invention, showing the layers composing the blanket progressively broken away; and Figure 2 is a fragmentary cross-sectional view of the printer's blanket shown by Figure 1.

In practicing the invention, a layer of felt or other suitable material 10 is provided on its outer surface with a thin layer 11 of soft rubber which readily and strongly adheres thereto. On the outer surface of the soft rubber, a relatively hard but resilient layer of rubber 12 is disposed, which strongly adheres to the soft rubber. Thereafter, the assembled layers of rubber are vulcanized in any suitable manner and a permanent union between the several elements composing the blanket is established.

When employed in printing machines, printer's blankets usually are wrapped around cylinders having longitudinally extending slots therein, in which the ends of a blanket are secured by any suitable means. During the operation of the machines, the cylinders having the blankets thereon are engaged by type supporting cylinders, and the blank paper is compressed and printed on one side between the blanket and the type. When the paper is reversed and printed on the opposite side, the oil from the ink on the printed side of the paper cumulatively is deposited upon the blanket.

From the foregoing description, it is apparent that a printer's blanket has been provided, having a resilient layer of binding material which is disposed between the hard rubber and the felt base, thus preventing cracking which would otherwise occur because of the pounding of the type thereon, and the bending and tensional stresses set up in the blanket during its operation. Moreover, even though cracks appear in the hard rubber, they do not result in the separation of the hard rubber from the other materials composing the blanket.

Although I have illustrated only one form which the invention may assume and have described that form in detail, it will be apparent to those skilled in the art that the invention is not so limited, but that various modifications may be made therein without departing from the spirit of the invention or from the scope of the appended claims.

What I claim is:

1. A printer's blanket composed of a felt base, a thin layer of soft rubber vulcanized to the base, and an outer layer of relatively hard rubber, vulcanized to the soft rubber.

2. A printer's blanket composed of a fibrous base, a thin layer of soft rubber of uniform thickness vulcanized on the base, and an outer layer of relatively hard rubber, vulcanized to the soft rubber.

In witness whereof, I have hereunto signed my name at Akron, in the county of Summit and State of Ohio, U. S. A., this 10 day of September, 1928.

CHARLES CATTRAN.